United States Patent [19]
Oliver

[11] 4,356,015
[45] Oct. 26, 1982

[54] DESALINIZATION PROCESS

[76] Inventor: Frank C. Oliver, 700 Delta Way, Watsonville, Calif. 95076

[21] Appl. No.: 962,965

[22] Filed: Nov. 22, 1978

[51] Int. Cl.³ ............................................. B01D 9/04
[52] U.S. Cl. ........................................ 62/543; 62/532
[58] Field of Search ................................. 62/543, 532

[56] References Cited
U.S. PATENT DOCUMENTS

| | | | |
|---|---|---|---|
| 2,241,726 | 5/1941 | Krause | 62/543 |
| 2,424,663 | 7/1947 | Mantle | 62/543 |
| 2,921,444 | 1/1960 | Bump et al. | 62/543 |
| 3,170,870 | 2/1965 | Bachman | 62/543 |

*Primary Examiner*—Norman Yudkoff
*Attorney, Agent, or Firm*—Michael D. Nelson

[57] ABSTRACT

A desalinization process is disclosed employing freezing and pressure steps. In the process, salt water is frozen to provide - liquid free ice. The ice is then crushed and subjected to a compression force and external heat for a period sufficient to liquify at least 30 percent of the crushed ice. The remaining ice is recovered and melted to yeild purifed water.

9 Claims, 2 Drawing Figures

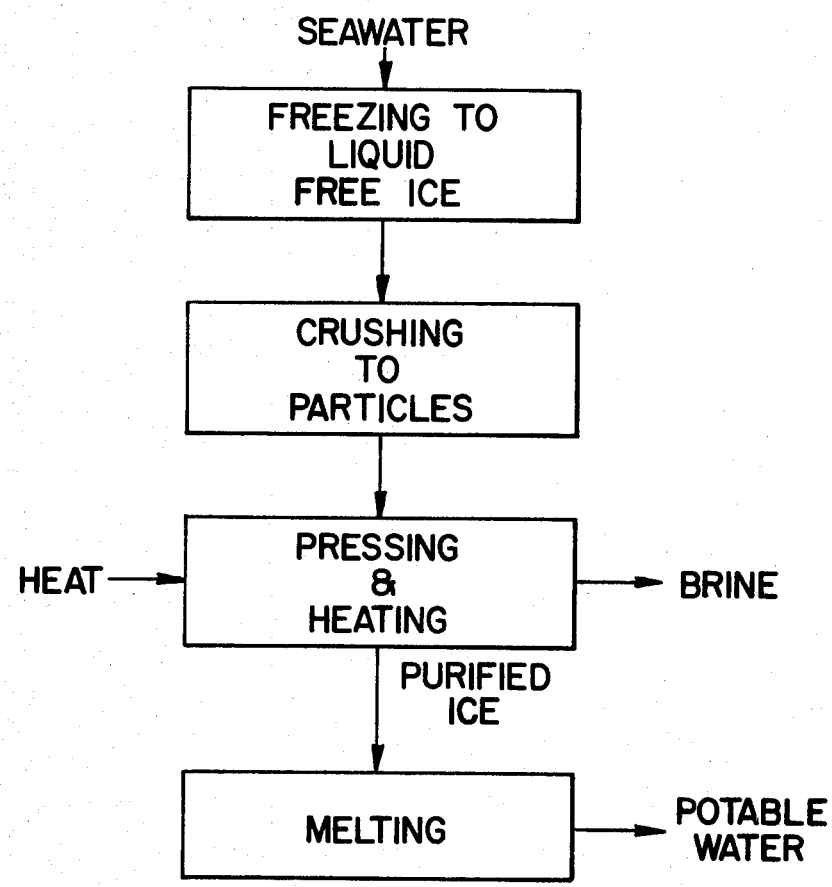
FIG _ 1
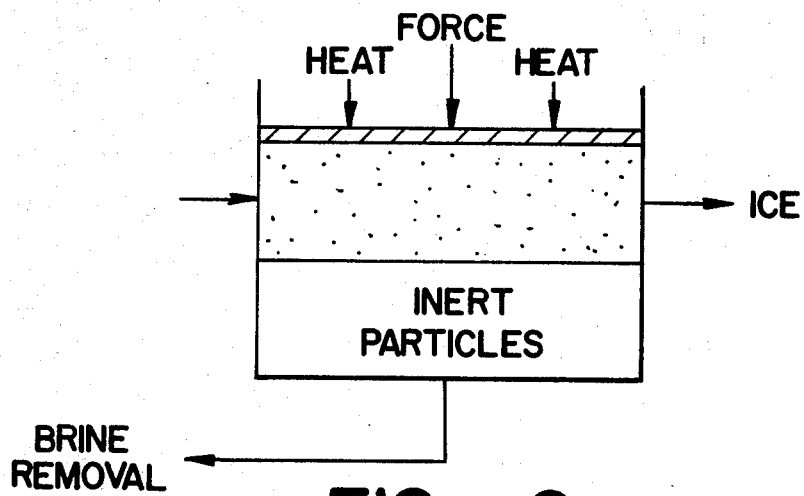
FIG _ 2

DESALINIZATION PROCESS

BACKGROUND OF THE INVENTION

Desalinization of sea water has held the promise of unlimited agriculture of all of the arid, presently nonproductive lands of the world. The obvious problem is that of economics. The conversion of sea water to steam is burdened with the high heat of vaporization requirement and extensive fouling of the equipment with corrosive salts.

The process of freezing purified ice crystals and removing them from a concentrated salt brine is also well known in the industry. These processes are typified by the process disclosed in U.S. Pat. No. 3,232,218. In that process careful freezing of ice crystals is conducted and a quick compression step employed to break down any occluded brine solution within the ice crystals. The icy slurry, referred to as ice slush, is then subjected to filtering, preferably under compression. The ice layer is recovered and melted to yield the purified water.

In the process disclosed in U.S. Pat. No. 2,921,444 sea water is frozen and then subjected to extreme pressure. The brine is separated from the ice in the process to yield a purified water. This process reduced the salt content from 36,000 ppm to 4,800 ppm under a pressure of 4,000 psi, and to 1,790 ppm under a pressure of 10,000 psi.

These processes, however, do not yield a potable water directly from sea water. Also, the intricate process steps and extreme pressures used in these processes renders them not economically viable as large scale desalinization methods. A need thus exists for an inexpensive process for making potable water from sea water, which does not involve intricate process steps or require large energy loads to effect desalinization.

It is an object of this invention to provide a process for desalinization of sea water.

It is an additional object of this invention to provide a process for recovering potable water directly from sea water.

It is another object of this invention to provide a process for recovering potable water from sea water by utilizing a freezing and pressing operation.

Other similar and related objects of this invention will become apparent from the following sepcificiations and appended claims.

In the drawings,

FIG. 1 illustrates a schematic flow diagram of the process steps of this invention.

FIG. 2 illustrates the use of a pervous barrier for separating the brine from the purified ice.

The aforegoing objects and their attendant advantages may be realized with the desalinization process of this invention. In the process a salt or sea water is frozen at a temperature sufficient to provide a liquid free ice. This ice is then crushed or pulverized to provide ice particles having a mean diameter less than one centimeter. The crushed ice is then subjected to a compressive force of about 5 to 1,200 pounds per square inch along with external heat for a period sufficient to liquify at least 30 percent of the crushed ice thereby forming a concentrated salt water solution and purified ice. The salt water solution is removed, preferably concurrently with the compression step and the purified ice recovered. The purified ice is then melted to provide a potable water.

It is important to note that the salt water must be frozen so that there is essentially no free liquid brine. Thus, the highest temperature to which the salt water can be cooled is the freezing point of the concentrated brine. This would require temperatures below −25° C. and preferably below −50° C. The freezing steps can be accomplished with any conventional freezing apparatus capable of freezing the ice to temperatures below −25° C. The methods described in U.S. Pat. No. 3,630,042 which patent disclosure is herein incorporated by reference. It should be noted that freezing temperatures below −25° C. may be employed but result in less brine being removed from the final product. The speed at which heat is removed from the salt water solution during freezing is not critical to the practice of this invention. However, careful slow freezing is believed to yield more concentrated brine crystals which liquify sooner during the compression step. It should be noted that the more concentrated the brine becomes during freezing, the colder the frozen ice must be taken in order to assure a liquid free ice. Exemplary coolants which may be used in the practice of this invention include, LNG as discussed in U.S. Pat. No. 3,630,042, ammonia, low molecular weight hydrocarbons having melting points below −25° C. and preferably having boiling points below −25° C., carbon dioxide, freon 14, etc.

The second step of this practice of my invention is crushing the liquid-free ice. In this step, the ice crushed in any conventional crushing operation so that the mean average diameter of the ice particles is less than 1 centimeter (cm), preferably less than 0.5 cm. and more preferably less than 0.1 cm. As referred to herein the mean diameter is the arithmetic average diameter of a single particle having varying shapes and mean average diameter refers to the average diameter of a group of particles. The ice at the temperature herein employed, fractures relatively easily into small particles. Generally, the colder the ice the more easily it shatters. This step may be performed concurrently with the compression step.

The third step is the compression step with external heat being added. In this step the curshed ice is subjected to a compressive force of 5 to 1,200 pounds per square inch and preferably from 10 to 500 pounds per square inch and more perferably from 15 to 250 pounds per square inch. Concurrently with the compression of the crushed ice heat is added. The amount of heat is sufficient so that together with the heat imparted from the compression, from 30 to 60 percent by weight of the crushed ice will melt. In a preferred embodiment from 25 to 55 percent by weight of the crushed ice is melted and more preferably from 40 to 50 percent by weight is melted. This amounts to approximately 30 to 80 calories per gram of crushed ice depending upon the original temperature of the crushed ice. In a particularly preferred embodiment, the initial heat supplied to said crushed ice is at a temperature of 80° C. to 150° C. and preferably from 95° C. to 115° C. and more preferably about 100° C. This causes a vapor flash at the surface of the ice which passes through the ice cake. It is believed that this vapor flash melts a portion of the ice which in turn dissolves the salt crystals and passes through the ice cake leaving the relatively salt-free ice behind. It should be noted that the heat may be supplied to the ice from the ambient temperature of the compression equipment.

The duration of the compression step depends upon the pressures used and the rate at which heat is being transferred into the crushed ice. Generally, the ice is under compression for a period of 0.1 to 2 hours and preferably from 0.3 to 1 hour.

The compression is preferably performed by direct mechanical force to one or more sides of the crushed ice body. Thus, a piston may squeeze the crushed ice within a confined chamber as disclosed in U.S. Pat. Nos. 2,921,444 and 3,170,870 which disclosures are herein incorporated by reference. Alternatively, the crushed ice may be compressed under heavy rollers as disclosed in U.S. Pat. No. 3,232,218, which disclosure is herein incorporated by reference. Another means is by centrifugal force.

The next step is removing the melted salt water or brine solution from the purified ice. This step is preferably conducted concurrently with the compression step so that the liquid portion is continuously removed from the crushed ice. This can be accomplished with perforations in the sides or end or both of the compression chamber. Preferably, a barrier is provided which supports the crushed ice under compression while allowing the liquid brine to pass there through. It is also preferred to locate the barrier below the ice cake so that gravity assists the flow of brine from the remaining ice. Exemplary barriers include perforated plates, screens, synthetic netting such as rayon netting, nylong netting, etc., cotten netting, sand, beads such as glass beads, steel beads, etc. cellulose matter, clay, etc. The perforations or holes in the barrier must be smaller than the mean average diameter of the crushed ice and preferably at least tenfold smaller.

The final step of the practice of this invention is recovering the purified ice and melting it to yield the purified water. The recovery of the ice can be a simple mechanical step such as disclosed in U.S. Pat. No. 2,921,444. The ice can be melted by supplying heat thereto in sufficient amounts as to melt the ice cake. The melting operation can be used to precool the salt water solution for freezing. In this way the energy loss from the system can be minimized.

In an exemplary batch operation, the incoming sea water is filtered to remove any large particulate matter. The filtered brine is then cooled and frozen to temperatures below −25° C. The frozen sea water or ice is then pulverized by mechanical crushers to yield a crushed ice having the desired minimum mean average diameter. Thus, crushed ice is then compressed and concurrently heated for a time period sufficient to melt from 30 to 60 percent of the ice. As the ice is melting the liquid brine is filtered off. At the conclusion of the compression step, the purified ice is recovered and melted.

A conversion of this process into a continuous process is one within the skill of those skilled in the art and therefore a discussion thereof herein is not believed necessary.

The following examples are presented to illustrate the practice of a specific embodiment of this invention. The presentation of this example should not be construed as limiting the invention to the specific process steps employed.

EXAMPLE 1

A rectangular press having outer dimensions of 8 inches (20.4 cm.) wide by 8½ inches (21.6 cm.) long by 3 inches (7.7 cm.) deep and inner rectangular chamber dimensions of 6 inches (15.3 cm.) wide by 6½ inches (16.6 cm.) long by 1 inch (2.6 cm.) deep. The press is made of stainless steel and is equipped with an upper aluminum piston or cover having the dimensions 5.95 inches (15.1 cm.) wide, 6 inches (15.3 cm.) long and 0.25 inch (0.6 cm.) thick. The bottom of the press is covered with a rayon netting over 1.5 inches (3.8 cm.) of absorbent material. A large screw clamp located at the center of the aluminum piston squeezes the material in the chamber and four side clamps are provided to assure a uniform pressure over the material being compressed.

One quart of sea water having a total salt content of approximately 32,000 ppm is filtered through a paper coffee filter to remove any particulate matter. The filtered sea water is then placed in a freezer and frozen for 48 hours. The ice is then removed from the freezer and placed in a dry ice bath for 15 hours. One-half of the frozen sea water (approximately 16 ounces) is then pulverized to a particle size of approximately 20 mesh U.S. standard size. The crushed ice is placed in the press chamber above the rayon netting. The aluminum piston or cover is heated to 100° C. and placed over the crushed ice. The clamp is turned down so that the aluminum piston applies a compressive pressure of 6.5 pounds per square inch. The clamp is tightened every 5 minutes to maintain a constant pressure over the ice. At the end of one hour the clamp and piston are removed and the ice recovered. The ice is melted to yield approximately 7 ounces of water. The water sample is analyzed for total salt content. The salt content was 397 ppm which is below the 500 ppm amount set as the California Public Health drinking water standards.

EXAMPLE 2

The procedure set forth in example 1 was repeated. The salt content of the water sample was measured at 403 ppm.

EXAMPLE 3

The procedure described in example 1 was repeated. The salt content of the water sample was measured at 1340 ppm.

EXAMPLE 4

The procedure described in example 1 was repeated. The salt content of the water sample was measured at 345 ppm.

EXAMPLE 5

The procedure described in example 1 was followed except the following modifications were made. A paper absorbent was used directly below the ice and no rayon netting employed. The piston cover was not heated to 100° C. but remained at ambient conditions. Four compression steps were employed with a change in the absorbent and recrushing between compression steps. The recovered water sample had a salt content of 67 ppm.

Numerous modifications and variations of the present invention are possible and are obvious to those skilled in the art. It is therefore to be understood that many aspects of the present invention may be practiced which are not specifically disclosed which aspects are within the scope of the appended claims.

I claim:
1. A method for purifying salt water which comprises:
   (a) freezing said salt water to a temperature sufficient to provide a liquid-free ice;

(b) crushing said liquid-free ice into ice particles having a mean diameter less than 1 cm;
(c) Compressing said crushed ice under a compressive force of about 5 to 1200 pounds per square inch and supplying external heat at a temperature from 80 to 150 degrees Centigrade for a period of tine sufficient to liquify at least 30 percent of said crushed ice, thereby forming a concentrated salt water solution and purified ice;
(d) removing said concentrated salt water solution from said purified ice; and
(e) recovering and melting said purified ice to recover purified water.

2. A process for purifying sea water to potable water which comprises;
(a) freezing said sea water to a temperature below −25° C. and sufficient to provide a liquid-free ice;
(b) crushing said liquid-free ice into ice particles having a mean diameter less than 0.5 cm;
(c) compressing said crushed ice under a compression force of about 10 to 500 psi and simultaneously applying heat to said crushed ice at an initial temperature of 100° C. for a time period sufficient to liquidfy 40 to 50 percent of the crushed ice thereby forming a concentrated salt water solution and purified ice;
(d) removing said concentrated salt water solution from said purified ice during said compressing step; and
(e) recovering and melting said purified ice.

3. A method for purifying salt water which comprises:
(a) Freezing said salt water to a temperature sufficient to provide a liquid-free ice;
(b) Crushing said liquid-free ice into ice particles having a mean average diameter less that 1 cm;
(c) Compressing said crushed ice under a compressive force of about 5 to 1,200 pounds per square inch and supplying external heat for a period of time sufficient to liquify at least 30 percent of said crushed ice, thereby forming a concentrated salt water solution and purified ice;
(d) Removing said concentrated salt water solution from said purified ice;
(e) Recovering and melting said purified ice to recover purified water.

4. The method defined in claim 1 wherein said concentrated salt water solution is removed from said purified ice during said compressing step.

5. The method defined in claim 4 wherein said salt water is frozen to a temperature below −25° C.

6. The method defined in claim 5 wherein said salt water is frozen to a temperature below −50° C.

7. The method defined in claim 2 wherein from 30 to 60 percent of said crushed ice is melted.

8. The method defined in claim 3 wherein said concentrated salt water solution is removed from said crushed ice by a barrier made of particulate material which is pervious to said concentrated salt water solution and inpervious to said crushed ice.

9. A process for purifying sea water to potable water which comprises;
(a) freezing said sea water to a temperature below −25° C. and sufficient to provide a liquid free ice;
(b) Crushing said liquid-free ice into ice particles having a mean average diameter less that 0.5 cm;
(c) Compressing said crushed ice under a compression force of about 10 to 500 psi and simultaneously applying heat to said crushed ice for a time period sufficient to liquify 40 to 50 percent of the crushed ice thereby forming a concentrated salt water solution and purified ice;
(d) Removing said concentrated salt water solution from said purified ice during said compressing step; and
(e) Recovering and melting said purified ice.

* * * * *